United States Patent Office 3,188,884
Patented June 15, 1965

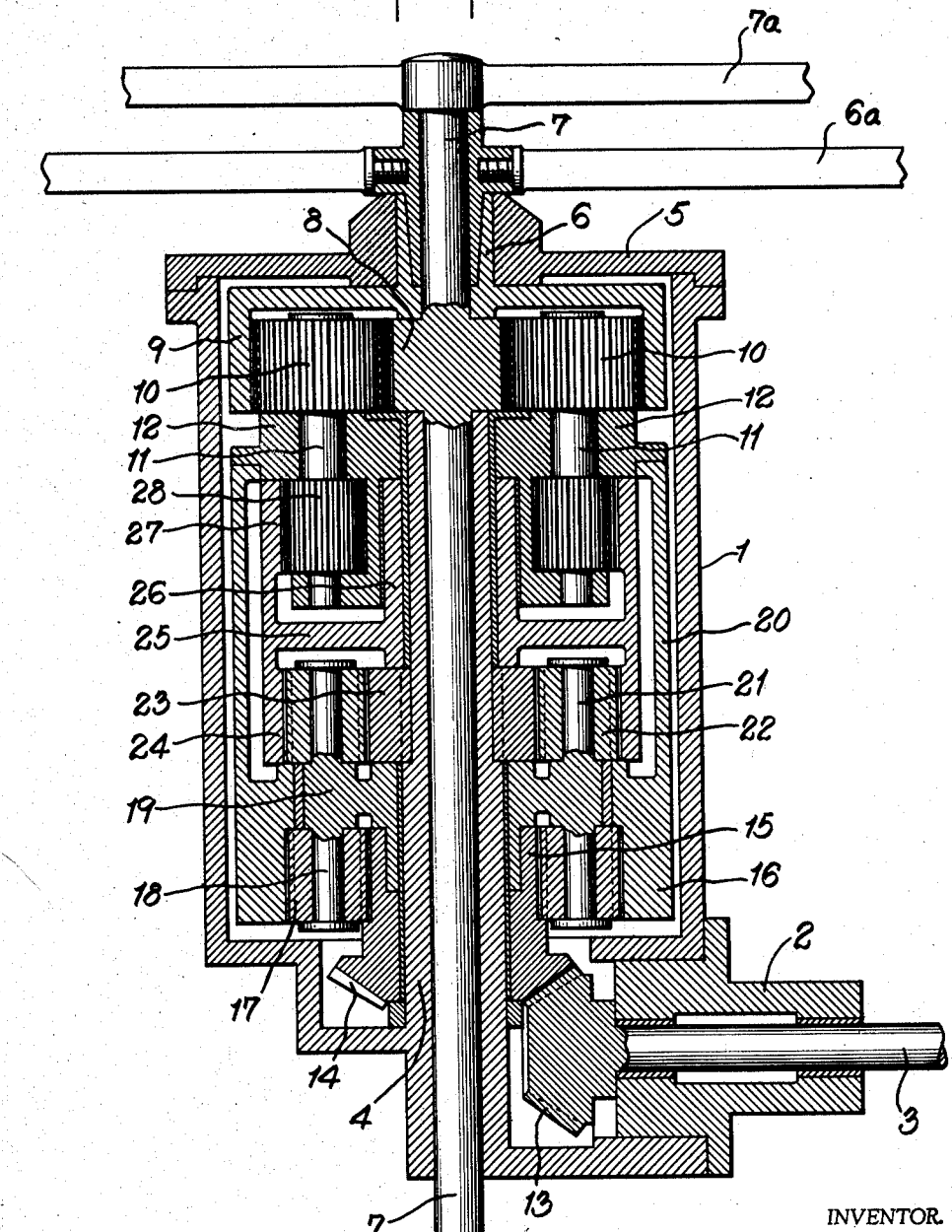

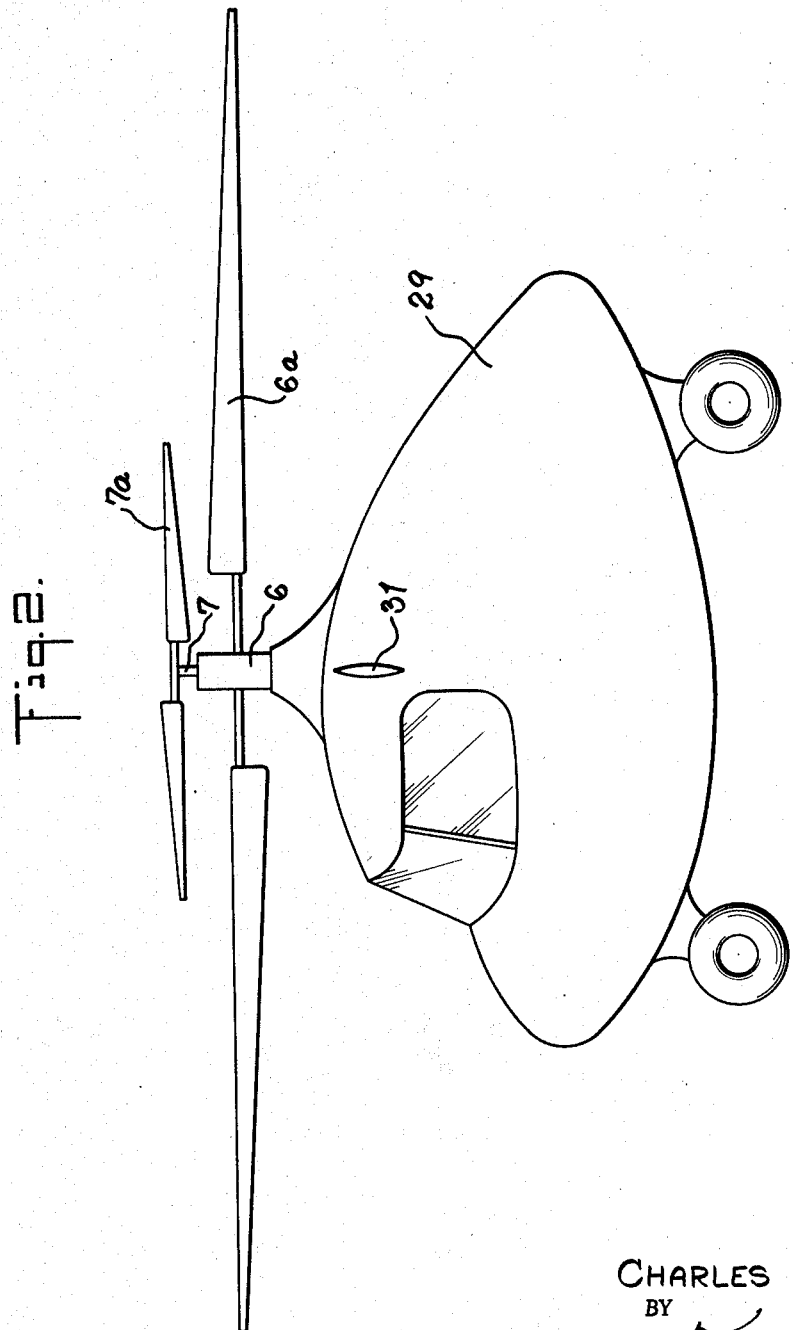

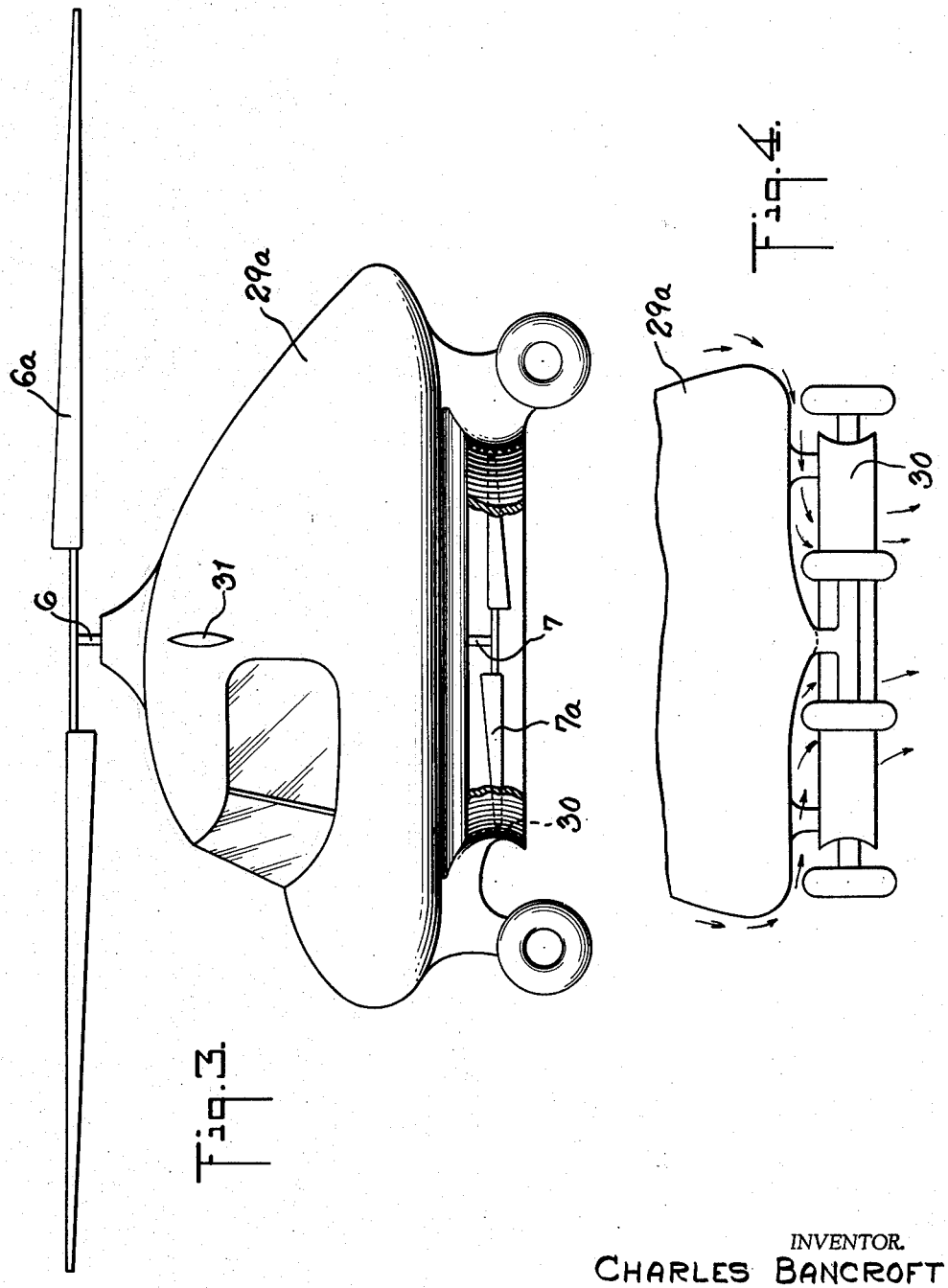

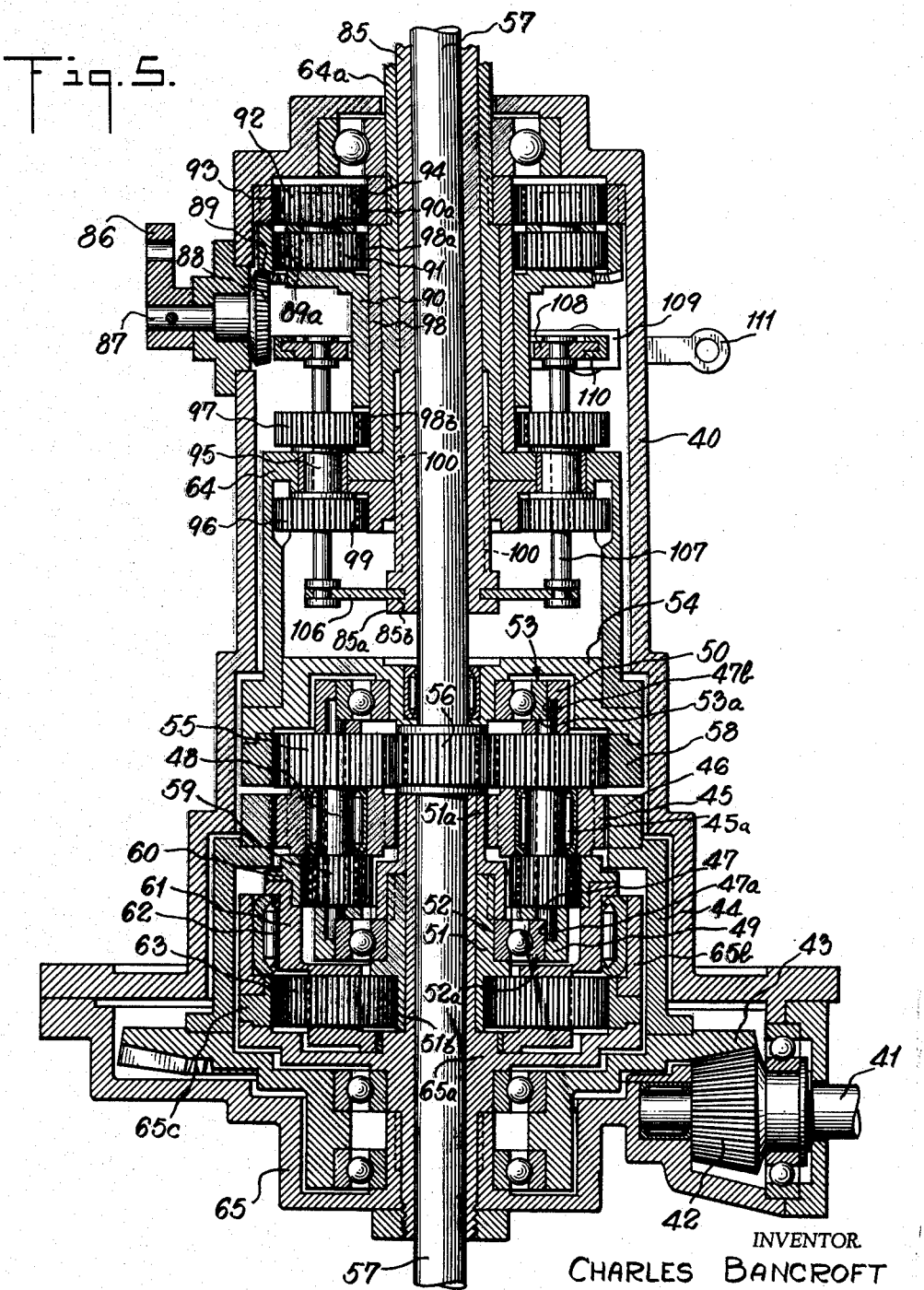

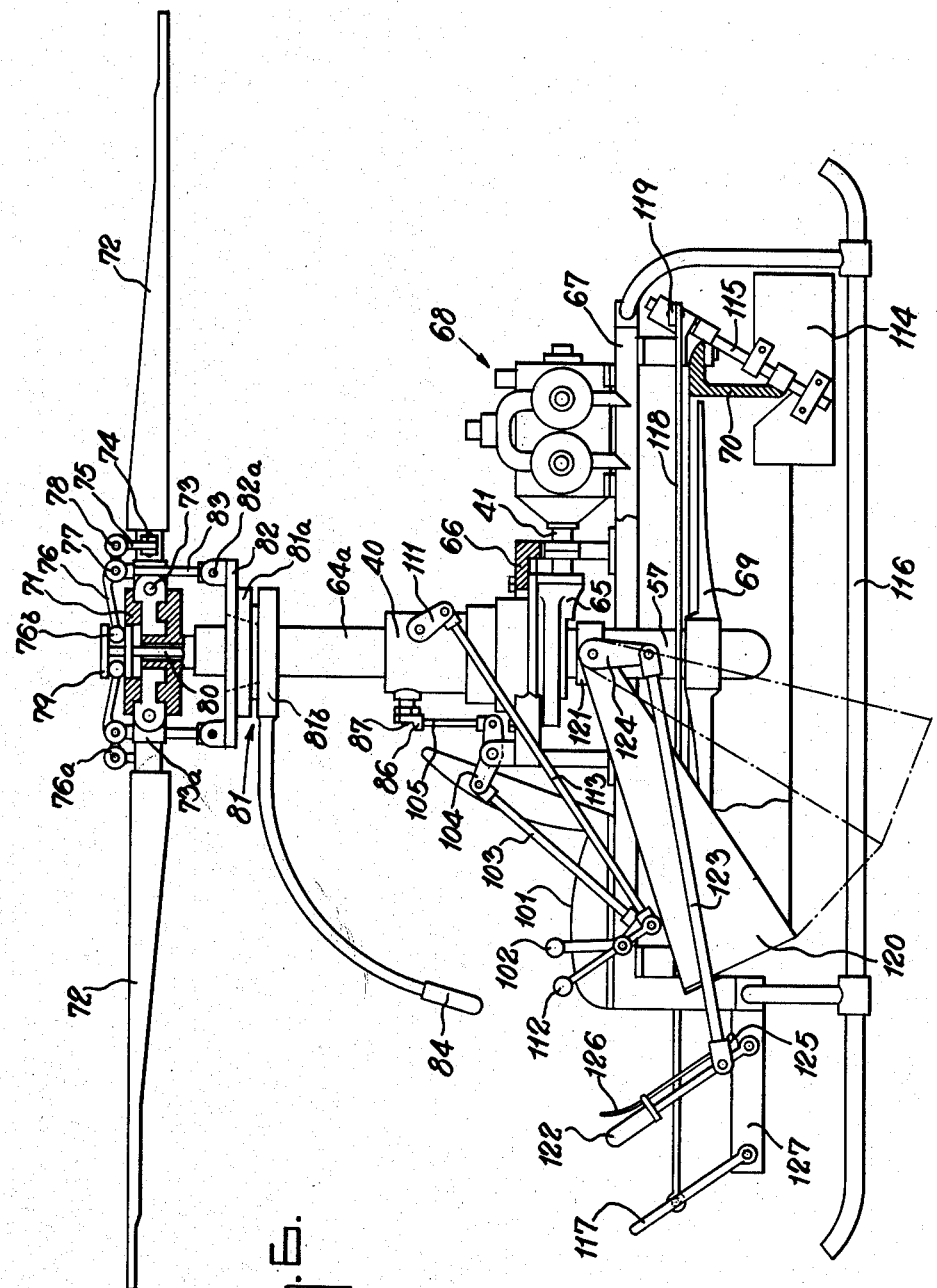

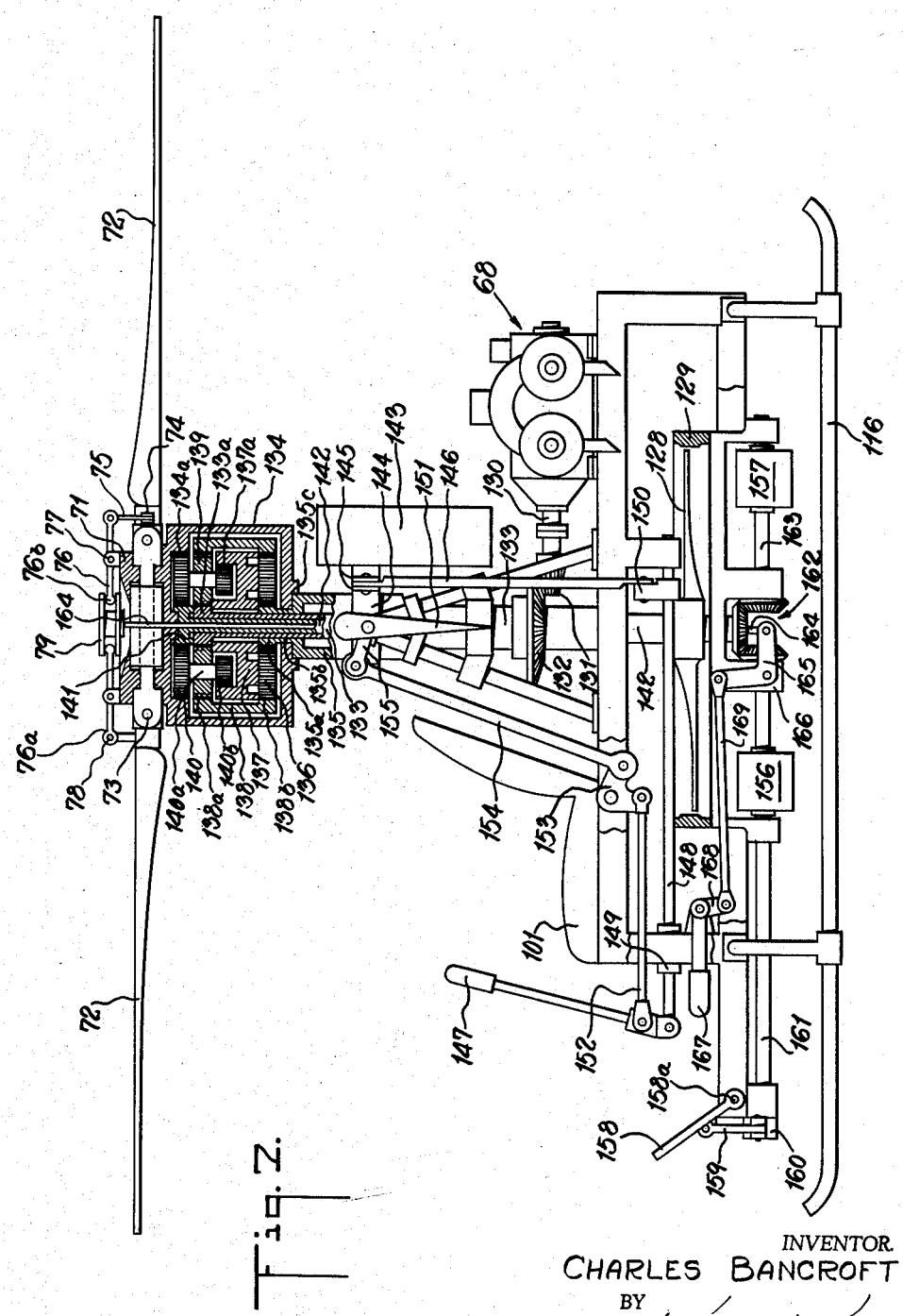

---

3,188,884
HELICOPTER MECHANISM
Charles Bancroft, Ferris Hill Road, New Canaan, Conn.
Filed Apr. 29, 1963, Ser. No. 277,072
16 Claims. (Cl. 74—665)

This application is a continuation-in-part application of application Serial No. 136,625, filed September 7, 1961, now abandoned.

This invention relates to a helicopter mechanism. The principles of the invention may be used in other fields as will become apparent from the following.

A helicopter having coaxial contrarotating rotors as a torque-free lifting system. Since the lifting system is torque-free the need for a tail rotor or other device to counteract the application of the rotor torque to the air frame is eliminated. With a coaxial rotor system the contrarotating rotors need not be synchronized. Further advantages of the coaxial rotor system are improved maneuverability, good ground clearance, and superior lifting qualities.

However, in helicopters using coaxial rotor systems complex control systems have been required to balance the torque applied to each of the rotors in order to prevent the application of unbalanced torque to the helicopter structure. In coaxial rotor systems where the two rotors are adjacent to one another aerodynamic interference may occur between the two rotors since the lower rotor operates in the wake of the vortices of the upper rotor and the behavior of the upper rotor is effected by the interaction of the reduced velocities between the two. In a coaxial rotor system where flapping blades are employed excessive clearance may be required between the rotors when they are to be positioned adjacent one another. Furthermore, mounting the rotors adjacent to one another in a coaxial system may result in excessive overall height of the helicopter.

An object of the invention is to eliminate the necessity of additional equipment or controls for balancing exactly the torque applied to each of two contrarotating helicopter rotors or propellers, or for using other complicated and power wasting means, to eliminate fuselage torque.

Another object of the invention is to provide a multi-speed drive for contrarotating helicopter rotors in order to obtain maximum efficiency under varying operating conditions without gear shifting.

Still another object is to permit the use of a small diameter, high speed, rotor or propeller, or a ducted propeller, to counteract the reaction of the torque applied to a single rotor type of helicopter.

An additional object of the invention is to provide a machine based both upon the principles of the helicopter and the autogyro and utilizing the particular advantages of each.

Another additional object of the invention is to provide a helicopter in which the air flow from the rotors is deflected to provide control forces for the helicopter.

A further object of the invention is to provide a transmission capable of delivering contrarotating motions of balanced torque and over a range of differential speeds to two output members.

Briefly stated, this invention provides gear means connecting a power source to the two contrarotating rotors or propellers so that the latter are forced to rotate relative to each other at a speed determined by the power source while at the same time they are free as a group to vary their rotation relative to the power source without any effect on their rotation relative to each other so that the reaction to the torque applied to one of these rotors or propellers will always be exactly balanced by the reaction to the torque applied to the other of the rotors or propellers without any residual torque being applied to the power source or its mounting other than might result from bearing friction.

In another embodiment of the invention a helicopter is provided with a rotor for developing a vertical lift component and a ducted rotor or propeller for developing an additional lift component. The gear means of the invention provides equal and opposite torques for contrarotating the rotors.

In still another embodiment of the invention the rotors are disposed coaxially with respect to one another and the rotational speed of the ducted rotor is greater than that of the other rotor for a given torque applied to each of the rotors. Thus when driven by means for applying substantially equal and opposite torque to the rotors, the rotors contrarotate at different speeds.

In an additional embodiment of the invention the longitudinal length of the ducted rotor or propeller is less than the longitudinal length of the other rotor.

In a further embodiment of the invention means are disposed in the fluid flow moving with respect to a helicopter rotor for applying a control force to the helicopter in response to said fluid flow. With this arrangement deflectors disposed in the downwash of a helicopter rotor can be positioned to apply attitude or directional control forces to the helicopter in response to the deflected fluid flow.

In still a further embodiment of the invention a helicopter having a ducted propeller for providing a lift component includes means for deflecting the fluid flow with respect to the propeller in order to produce a thrust component for propelling the helicopter in a substantially horizontal direction and to provide at least a partial autorotation of the helicopter main rotor.

A specific example of the invention is illustrated by the accompanying drawings, in which:

FIG. 1 is a vertical longitudinal section of the mechanism itself;

FIG. 2 is a side elevation of one form of helicopter using the mechanism;

FIG. 3 is a side elevation showing another form of helicopter using the mechanism;

FIG. 4 is an end view of the bottom portion of the helicopter shown in FIG. 3;

FIG. 5 is a vertical longitudinal section of another embodiment of the mechanism of the invention;

FIG. 6 is a side elevation showing a helicopter adapted for another embodiment of the mechanism of the invention and having controlling means beneath the propeller device;

FIG. 7 is a side elevation showing another helicopter adapted for a further embodiment of the mechanism and having controlling means disposed between the sustaining rotor and the propeller device.

Referring first to FIG. 1, the mechanism comprises a stationary cylindrical casing 1, adapted to be mounted non-rotatively to the helicopter fuselage or other mounting. This casing is vertically arranged, its lower portion mounting a bearing block 2 in which a horizontal input drive shaft or rotary input member 3 is journalled.

Also, the lower end of the casing 1 provides an upwardly extending tubular bearing member 4 which extends upwardly to a location close to the upper end of the casing, the latter being closed by a removable end 5.

Two rotary output members are required for the two contrarotating rotors or propellers. One is formed by a tubular output shaft 6 journalled by the casing end 5, and the other is formed by a solid drive shaft 7 which extends upwardly through and rotatively free from the tubular shaft 6, and downwardly completely through the casing 1, this longer depending portion of the shaft 7 being journalled by the tubular bearing 4. The shafts 6 and 7, the tubular bearing 4 and the casing 1 are coaxial relative to each other. Means for intergearing the two output members 6 and 7 is provided by a planetary gear train. This includes a sun gear 8 integral with the shaft 7, an internal ring gear 9 integral with the shaft 6, and one or more planet gears 10. Each planet gear 10 is keyed to a rotary planet shaft 11 journalled by a planet carrier 12. This planetary gear train intergears the shafts 6 and 7 for contrarotation dependent on rotative control of the planet carrier 12.

The inner end of the input shaft 3 is fixed to a bevel gear 13 which right angularly meshes with a bevel gear 14, the latter being journalled on the outside of the tubular shaft 4 and having an upwardly extending portion forming a sun gear 15 of a second planetary gear train. This second train includes an internal ring gear 16 and one or more planet gears 17 each journalled rotatively on a planet shaft 18 mounted by a planet carrier 19, the latter being journalled on the adjacent portion of the tubular bearing 4. The ring gear 16 is rotatively interconnected with the planet carrier 12 of the first train, by a vertically extending tubular shaft 20 having a diameter almost as large as the casing 1.

Rotation of the input shaft 3 is transmitted through this second planetary gear train to the planet carrier 12 of the first gear train, dependent on control of the rotation of the second train's planet carrier 19.

The planet shafts 18 extend downwardly from the second train's planet carrier 19 and the latter also mounts one or more upwardly extending planet shafts 21 on each of which the planet gear 22 of a third planetary gear train, is mounted. This third train includes a sun gear 23 which is keyed or otherwise immovably fixed on the outside of the tubular bearing 4, and a ring gear 24.

The ring gear 24, of the third train is mounted by a web 25 that extends radially inwardly to a hub 26 which is journalled for free rotation on the tubular bearing 4. This web 25 also mounts the ring gear 27 of a fourth planetary gear train. This fourth train includes one or more planet gears 28 keyed on each of the planet shafts 11 of the first gear train, the latter's planet carrier 12 being partly journalled on the top portion of the tubular bearing 4 and partly journalled on the hub 26. This fourth planetary gear train does not have a sun gear, its planet gears 28 being rotatively interconnected with the planet gears 10 of the first planetary gear train.

It is to be noted, however, that the ring gear 27 might have substituted for it a sun gear integral with the web 25 and meshing with the planet gears 28 in those cases where the two contrarotating rotors or propellers are of substantially equal size and torque requirements, instead of being, as described, a small diameter, high speed element balanced against a large diameter, slow speed element. Also, the gear pitch diameters may be varied. The design variations permit the torque balancing action to be varied widely.

Helicopter rotors 6a and 7a are fixed to the shafts 6 and 7 respectively. These rotors are not shown in detail since their aerodynamic design may be varied. Likewise, the details of the rotor hub constructions are not detailed.

In operation, rotation of the gear 14, due to connecting a suitable rotary power source to the input shaft 3, rotates the ring gear 16 if the planet carrier 19 is not permitted to rotate freely. This rotation is transmitted through the large tubular shaft 20 to the planet carrier 12 which causes the planet gears 10 to revolve and thus effect contrarotation of the shafts 6 and 7 through the action of the first planetary gear train. However, the speeds of the output shafts relative to the casing depends on the relative torque of the two propellers, since the torque applied one is provided by the torque reaction of the other relative to each other. This follows from the fact that the rotation of the planet gears 10 is controlled by the planet gears 28 which through the ring gears 27 and 24 are controlled by the latter's engagement with the fixed gear 23, to neutralize any torque that might otherwise be applied by the input shaft in driving the two propellers relative to each other.

Thus, the rotor 7a cannot rotate with a torque greater or lesser than the torque reaction of the rotor 6a. The reverse of this is also true.

The rotors 6a and 7a may vary their group rotation relative to the power source without any affect on the rotation of the two rotors relative to each other. The reaction to the torque of one of these rotors is always exactly balanced by the reaction of the torque applied to the other, excepting for the bearing friction that might be involved by the mechanism. With adequate bearing construction and lubrication this does not become a serious factor especially if the design, as previously indicated, is such as to reduce corrective motions of gearing to a minimum. It follows that insofar as the casing 1 is concerned, it receives either no torque or negligible torque for transmission to the fuselage of the helicopter or other structure supporting the casing and its power source. The speed differential between the two rotors is fixed by the relative size of the various gears used by the mechanism and other design changes, as previously indicated.

Referring now to FIG. 2, this shows somewhat schematically a fuselage 29 housing a suitable motor or other power source, unillustrated, and with the rotor 6a substantially larger than the rotor 7a. These rotors may be of any conventional type, and aerodynamic controls may be included, as required to provide a practical helicopter. The general principles of helicopter design are described by various texts on this subject.

With a construction such as is shown by FIG. 2, and using the mechanism previously described, the rotor 7a would rotate faster than the rotor 6a as required for one to balance the other. The rotative force applied to one of the contrarotating rotors depends on the reaction of the other. In achieving this condition no rotary power is lost, neglecting friction, because in effect, the rotary power is fed between the two rotors with each dependent on the other for its reaction to the rotative action, each rotor contributing to the lift.

In FIGS. 3 and 4 the rotor 6a is shown with the opposite reaction required to remove or eliminate torque from the fuselage 29a which is provided by a rotor or propeller 7a radially enclosed by a venturi 30 spaced below the bottom of the fuselage so that it may receive an adequate supply of air as shown by FIG. 4.

Thus FIGS. 2, 3, and 4 show examples of how the present invention permits a relatively small high speed rotor or propeller to both supply a lifting force to the helicopter and to balance the reaction of the large single rotor 6a.

In connection with FIGS. 3 and 4 it is to be understood that the rotor or propeller 7b is mounted on a depending extension of the shaft 7, shown by FIG. 1 as projecting through the bottom of the casing 1.

In all cases, as previously explained, neither of the two output members 6 and 7 can produce a rotary power output that is not balanced relative to the other.

Again neglecting bearing friction, no power is lost because the reaction required to balance the torque of each rotor is provided or absorbed by the corresponding reaction required by the other, both being lifting elements.

With fuselage torque absent, as explained hereinabove, directional control and stabilizing problems are greatly eased. In the drawings, lateral control fins 31 are shown for control purposes. These may be rotated, together or individually, about their horizontal axis.

An additional embodiment of the mechanism of the invention is shown in FIG. 5. The mechanism which serves as the means for applying equal and opposite torques to the rotors or propellers is a transmission device having casing 40 which is adapted to be mounted in a substantially vertical position within the helicopter. Input shaft 41 delivers the input motion to the transmission from the power plant. Input bevel drive gear 42 mounted on shaft 41 engages bevel driven gear 43 mounted on tubular support 44. Ring gear 46 which is connected to support 44 engages planet gear 45 supported by needle bearings 45a on shaft 47. Planet gear 45 engages sun gear 51a which is coupled to sleeve 51. Sleeve 51 is rotatably mounted on support 65a connected to base 65.

Shaft 47 is supported at one end by support ring 49 and at the other end by support ring 50. Support ring 49 is mounted by ball bearing 52 for rotation with respect to sleeve 51 and cylindrical portion 65b coupled to support 65a. Ring support 50 is mounted for rotation by ball bearing 53 secured to support 54. Slots 47a and 47b engage outer bearing races 52a and 53a, respectively, and thereby maintain shaft 47 stationary with respect to the ring supports.

Planet gears 55 and 59 are connected to one another by means of hollow shaft 48 mounted for rotation on shaft 47. Planet gear 55 engages both sun gear 56 attached to high speed propeller shaft 57 and ring gear 58 mounted on support 54. Planet gear 59 engages ring gear 60 which is mounted upon planet gear carrier 61 supported by needle bearings 62 within tubular portion 65b of support 65a. Planet gear 63 supported by planet gear carrier 61 engages both stationary sun gear 51b which is formed adjacent to the end of sleeve 51 and ring gear 65c attached to support 65a.

The torque transmitted by planet gear 55 not only is applied to sun gear 56 attached to high speed propeller shaft 57 but is also applied to ring gear 58 connected to support 54 which in turn is connected to carrier 64 from which extends low speed rotor shaft 64a. With the gearing described above all of the torque applied to one of the ring gear and sun gear necessarily comes from the other, with the result that the torque applied to the ring gear and the sun gear are in balance for all speed conditions. Thus even when shafts 57 and 64a are rotating at disequal speeds the torque transmitted to each of them is equal and opposite in direction with the result that rotor and propeller torque is not applied to the air frame of the helicopter.

As shown in FIG. 6 the transmission of FIG. 5 having casing 40 and base 65 is supported by mount 66 attached to frame member 67 of the helicopter. Aircraft engine 68 is coupled to the transmission by input shaft 41. High speed shaft 57 rotates propeller or rotor 69 within shroud ring 70 which confines the flow of air to a downward direction as it moves through the propeller and thereby develops a lift force component. With this arrangement the propeller becomes a ducted fan.

Low speed output shaft 64a of the transmission is connected to hub 71 having flapping hinges 73 to which the blades of rotor 72 are attached. Each of the rotor blades which are adapted to be pivoted about their longitudinal axis with respect to socket portion 73a of the flapping hinges is provided at a side portion thereof with pivot 74 engaged with link 75. Pitch arm 76 is mounted about pivot 77. End portion 76a of the pitch arm is connected by pivot 78 to link 75 while end portion 76b is engaged within the grooved portion of collar 79. Vertical movement of collar 79 by means of control shaft 80 rocks the pitch arms about pivots 77 and the pitch arms by means of links 75 rotate the rotor blades about their longitudinal axis and thereby change the pitch of the blades. Thus by means of movement of control shaft 80, the collective pitch of the rotor blades can be set at a predetermined angle in order that a lift force component is developed.

Cyclic pitch control is provided by swash plate 81 including upper ring 81a which is gimballed with respect to shaft 64a and rotates with it. Upper ring 81a is connected to ring 82 from which links 83 extend between pivots 82a and pivots 77. The position of upper ring 81a is determined by the position of non-rotating lower ring 81b which in turn is positioned by cyclic pitch control handle 84.

In certain applications of the transmission device shown in FIG. 5 such as in a helicopter, it may be necessary to transmit a control motion to one rotating shaft operating within a contrarotating shaft. An example of a need for such a motion would be that required for pitch control of propeller 69 mounted on shaft 57 within shaft 64a. Thus the relative motion of a shaft mounted coaxially with shaft 57 can be employed to control the pitch of the blades of either propeller device. As shown in FIG. 5 high speed shaft 57 driven by sun gear 56 can extend in either or both of the directions as shown in the drawings. In the case where the transmission is to provide rotary pitch control motion to propeller 69, the propeller can be considered connected to the right end portion of shaft 57 as seen in FIG. 5.

Control shaft 85 is adapted to rotate with respect to the casing 40 and shafts 57 and 64a in order to apply a control motion to the propeller or other like devices (FIG. 5). The input control motion at control arm 86 is transmitted by shaft 87 and bevel drive gear 88 to bevel driven gear 89. Bevel driven gear 89 includes ring gear 89a. Planet gear carrier 90 includes planet gear shaft 90a about which planet gears 91 and 92 are pivotally mounted. Planet gear 92 is disposed between ring gear 93 secured to casing 40 and sun gear 94 which is connected to low speed shaft 64a.

Carrier 64 pivotally supports planet gear shaft 95 to which is attached planet gears 96 and 97. Sleeve 98 includes sun gears 98a and 98b which are engaged with planet gears 91 and 97, respectively. Planet gear 96 engages sun gear 99 which is connected to control shaft 85 by slip joint or spline 100.

With this arrangement the rotary motion transmitted to sun gear 94 by shaft 64a rotates planet gear 92 with respect to stationary ring gear 93. The motion of the planet gear revolves shaft 90a of carrier 90 which moves planet gear 91. Since ring gear 89a is normally stationary, the motion of planet gear 91 corresponds to that of planet gear 92 with the result that sun gear 98a rotates at the same velocity as sun gear 94. This velocity is transmitted through sun gear 98b and planet gear 97 which is coupled to planet gear 96. Since the planet gears are of a corresponding size, sun gear 99 is necessarily driven at the speed of sun gear 98b. Thus the plurality of gears results in control shaft 85 rotating at the same velocity as low speed output shaft 64a.

However when arm 86 is moved and bevel input gear 22 is rotated, bevel driven gear 89 is rotated and it rotates ring gear 89a with respect to casing 40. This movement is transmitted through the remainder of the gear train so that momentary relative motion takes place between control shaft 85 and low speed output shaft 64a and after which the two shafts continue to rotate at the same speed. Thus the control shaft cannot only be rotated with the output shaft, but upon demand it can be moved with respect to the output shaft while the shafts continue to rotate in order to transmit a control motion.

As shown in FIG. 6 collective pitch control motions are transmitted to arm 86 by means of linkage extending from adjacent pilot's seat 101. The linkage includes collective pitch handle 102, link 103, pivoted arm 104 and link 105.

Where it is desired to reciprocate control shaft 85 parallel to its longitudinal axis and at the same time to enable control shaft 85 to be rotated as discussed above, the shaft can be provided with collar 85a in groove 85b of which disc 106 is adapted to slide. Pins 107 connect disc 106 to disc 108. Fork 109 engaging the side surfaces of disc 108 receives slide block 110 which is moved by arm 111 through a path of travel extending longitudinally with respect to casing 40. In this way arcuate motion of arm 111 results in disc 108 being moved in a longitudinal direction and thereby disc 106. Consequently a longitudinal reciprocating motion can be imparted to control shaft 85. As shown in FIG. 6 control handle 112 is connected by link 113 to arm 111.

By way of an example the arrangement shown in FIG. 6 can include a transmission of the type shown in FIG. 5 which with proper ratio of propeller sizes and minimum gear motion to obtain torque balance can establish a one-to-nine speed ratio between the speed of rotor 72 and propeller 69. Thus with an engine speed, for example, of 2400 r.p.m., the rotor would rotate at 200 r.p.m. while the propeller would rotate at 1800 r.p.m. The collective pitch controls for the rotor and the propeller enable the pilot to control the relative speeds of the two propellers by varying the pitch of their blades as operating conditions require in order to maintain a predetermined altitude, etc. Since the torque furnished to each of the two propellers must be the same, it follows that the power distribution to the two propellers from the engine is proportional to their relative speeds.

In order to apply directional control forces to the helicopter as shown in FIG. 6, means are provided for applying a control force to the helicopter in response to the fluid flow or downwash from the rotor such as that provided by deflector 114 which is rotated about inclined pivot 115. Due to the inclined pivot axis, deflector 114 upon movement from its neutral fore and aft position, that is parallel to skid 116, is capable of deflecting air flow in a lateral direction as it passes beyond propeller 69. Thus by means of deflector 114 a turning moment can be applied to the helicopter about its vertical axis. The pilot's directional commands are transmitted by means of rudder pedal 117, link 118 and arm 119 connected to pivot 115.

A fore and aft force component, that is a component adapted to move the helicopter in a forward or rearward direction, can be obtained by deflecting at least a portion of the air flow passing beyond propeller 69. As is shown in FIG. 6 deflector 120 is adapted to provide a varying amount of a forward force component to drive the helicopter. Thus deflector 120 which is composed of telescoping sections as indicated by the dotted lines in the figure which is pivotally mounted with respect to collar 121 adjacent shaft 57 can be moved downwardly to a position where it intersects a portion of the air flow issuing from propeller 69 and deflects it rearwardly. The position of the deflector is controlled by the pilot by means of control handle 122 which is connected by link 123 and arm 124 to the deflector. Latch 125 controlled by handle 126 enables control handle 122 to be locked with respect to frame member 127 for various positions of the deflector.

The helicopter of FIG. 7 includes rotor 72 and related linkage similar to that shown for the helicopter of FIG. 6 as well as propeller 128 rotating within shroud ring 129. Hub 71 to which the rotor is attached is mounted on housing 134 of the rotor drive transmission. Aircraft engine 68 of the helicopter drives input shaft 130 which is connected to bevel drive gear 131 engaged with bevel driven gear 132. Driven gear 132 is attached to shaft 133 extending within housing 134 which is integral with rotor hub 71.

Shaft 133 is connected to sun gear 133a which is engaged with planet gear 139 mounted for rotation on shaft 140. Shaft 140 can be supported with respect to carrier 138 similarly as shaft 48 in FIG. 5 is supported with respect to rings 49 and 50. Planet gear 139 is also engaged with ring gear 138a in carrier 138. Planet gear shaft 140 is connected to both of planet gears 140a and 140b. Planet gear 140a engages ring gear 134a in housing 134 while planet gear 140b engages ring gear 137a in carrier 137. Planet gear 140a also engages sun gear 141 which is attached to shaft 142 which drives propeller 128.

Planet gear 136 mounted on carrier 137 is engaged with stationary gear 135a connected to extension 135b and support column 135. Seal 135c is disposed between extension 135b and housing 134. Planet gear 136 is also engaged with ring gear 138b in carrier 138.

With this arrangement of gears, the drive from shaft 133 is transmitted by sun gears 133a to planet gear 139 which causes shaft 140 with planet gears 140a and 140b to revolve about the central axis of the transmission. Due to the planetary gear arrangement the torque applied to housing 134 and shaft 142 are equal and in opposite directions. In this way rotor 72 and propeller 128 are driven in opposite directions of rotation under a balanced torque condition by means of housing 134 and shaft 142, respectively, with the result that neither rotor nor propeller torques are applied to the helicopter air frame.

Attitude and directional control of the helicopter can be obtained by means of control surfaces which act in response to the air flow passing from the rotor and the propeller. Deflector 143 pivotally mounted with respect to collar 144 is rotated by means of arm 145 and link 146. Tilting deflector 143 with respect to the vertical while disposed in the downwash from rotor 72 generates a moment about the longitudinal axis of the helicopter which can be employed for attitude control. The pilot's manual commands for the lateral control are inserted by means of handle 147 having link 148 pivotally mounted within bushing 149 and connected to arm 150 which in turn is coupled to link 146. Thus by swinging control handle 147 in a lateral direction, link 148 is rotated with respect to bushing 149 and operates arm 150 to swing deflector 143.

Deflectors 151 pivotally mounted with respect to collar 144 are swung in a fore and aft direction by fore and aft movement of control handle 147 which is coupled thereto by link 152, crank 153, link 154, and arm 155. By rotating deflector 151 in a counterclockwise direction as shown in FIG. 7 the air flow or downwash from rotor 72 is urged by the deflector in a rearward direction so that a forward force component is applied to the helicopter.

Directional control of the helicopter is obtained by the application of turning forces generated by deflectors 156 and 157. By swinging rudder pedal 158 about pivot 158a, link 159 is moved in a vertical direction and in turn swings arm 160 which rotates shaft 161. Bevel gears 162 reverse the direction of motion of shaft 161 which is transmitted to shaft 163. Thus the deflectors move in opposite directions for a given movement of rudder pedal 158. By tilting the deflectors in opposite directions with respect to the longitudinal axis of shafts 161 and 163, it can be seen that the downwash from propeller 128, upon being turned by the deflectors, imparts a turning moment to the vertical axis of the helicopter.

Shaft 164 connected to collar 79 extends through the interior of shaft 142 to bellcrank 165 pivotally mounted on frame 166. Handle 167 by means of arm 168 and link 169 is adapted to swing the bellcrank and reciprocate shaft 164 to raise or lower the collar and thereby change the pitch of rotor 72.

In each embodiment of the helicopter of the invention, the transmission is designed to furnish equal torque to the rotor and propeller and therefore the power distribution to the rotor and the propeller from the engine is proportional to their relative speeds. For the case of vertical or hovering flights, the greater portion of the engine's output is absorbed by the ducted propeller. However the power distribution can be varied to some extent by relative changes in the pitch of the blades of the rotor and propeller.

After the transition to horizontal flight is made either by tilting the rotor by the swash plate device, by tilting the helicopter, or by deflecting the exhaust of the ducted propeller to impart horizontal motion to the helicopter, cyclic pitch control or the tilt of the rotor may be employed in order to provide the conditions necessary to obtain autorotational effects on the rotor which can affect its rotational speed and thereby change its power absorption from the power source and also its share of the sustaining lift.

By increasing the pitch of the ducted propeller and feathering the rotor prior to take off, it is possible to build up a condition of kinetic energy in the form of a higher than normal rotational speed for the rotor. Subsequently by suddenly increasing the pitch of the blades of the rotor a greater than normal lifting force can be developed, so that loads heavier than those which normally can be lifted, can be lifted in a sudden manner. Once lifted vertically from the ground these heavier than normal loads can be sustained due to the autorotation of the rotor accompanying horizontal movement of the helicopter.

Thus in accordance with the invention the embodiments of the helicopter can operate either as a true helicopter or as an autogyro or can operate in some intermediate mode. Thus the invention can be employed to combine the advantages of both types of machines.

What is claimed:

1. A mechanism for helicopters and the like including a rotary power input member and two rotary power output members, first planetary gear means for intergearing said output members for contrarotation and second planetary gear means for intergearing said input member to different portions of said first planetary gear means so that the rotative speeds of the latter are free to vary relative to said input member without affecting their speed ratio relative to each other.

2. The mechanism of claim 1 in which the first planetary gear means includes a planetary gear train comprising sun, planet and ring gear elements, and the second planetary gear means includes a planetary gear train comprising sun, planet and ring gear elements, and means for transmitting rotation from two of said elements of the second train to two of said elements of the first train.

3. A helicopter mechanism including a rotary input shaft and two output shafts, rotors connected to said output shafts, a first planetary gear train comprising a sun gear connected to one of said output shafts, a ring gear connected to the other of said output shafts, and at least one planet gear, a second planetary gear train comprising a sun gear connected to said input shaft, a ring gear rotatively connected to the planet gear of said first train for rotation by the orbital travel thereof, and at least one planet gear, a third planetary gear train comprising a stationary sun gear, a ring gear, and a planet gear operatively connected to the planet gear of the second train for orbital travel therewith, and means for operatively connecting the ring gear of said third train with the planet gear of said first train for rotation thereof by said ring gear of said third train.

4. A gear transmission for providing two output motions of opposite sense from a single input motion and being self-balancing with respect to reactive torques applied thereto, said transmission comprising first planetary gear means including an output sun gear, an output ring gear, a first pinion carrier, and a first pinion mounted on said first pinion carrier and engaging said output sun gear with said output ring gear; second planetary gear means including an input sun gear, a second ring gear connected to said first pinion carrier, a second pinion carrier and a second pinion mounted on said second pinion carrier and engaging said input sun gear with said second ring gear; third planetary gear means including a stationary sun gear, a third ring gear and a third pinion mounted on said second pinion carrier and engaging said stationary sun gear with said third ring gear; and fourth planetary gear means including a fourth pinion mounted on said first pinion carrier and connected to said first pinion and a fourth ring gear connected to said third ring gear and engaging fourth pinion.

5. A gear transmission for providing two output motions of opposite sense from a single input motion and being self-balancing with respect to reactive torques applied thereto, said transmission comprising an input planetary gear means including an input sun gear for receiving an input motion, an input planet gear, an input planet gear carrier, and an input ring gear; an output planetary gear means including an output sun gear for providing one output motion, an output planet gear, an output planet gear carrier connected to said input ring gear, and an output ring gear for providing another output motion; and an intermediate planetary gear means including a stationary intermediate sun gear, an intermediate planet gear mounted on said input planet gear carrier, an intermediate ring gear and an additional intermediate planet gear mounted on said output planet gear carrier and connected to said output planet gear, said additional intermediate planet gear engaging said intermediate ring gear.

6. A gear transmission for providing two output motions of opposite sense from a single input motion and being self-balancing with respect to reactive torques applied thereto, said transmission comprising a rotary input shaft, first and second rotary output shafts, a first planetary gear train including a sun gear connected to said first output shaft and a ring gear connected to said second output shaft and at least one planet gear having a carrier, a second planetary gear train including a sun gear rotatively connected to said input shaft and a ring gear and a planet gear having a carrier, one of said carrier and ring gear of this second train being rotatively connected to the planet carrier of the first train, a third planetary gear train including a stationary sun gear, a ring gear, and a planet gear having a carrier, one of said carrier and ring gear of this third train being connected to the other one of said carrier and ring gear of said second train, and means for rotatively connecting rotary motion of the planet gear of said first train to the other one of said carrier and ring gear of said third train.

7. A gear transmission for providing two output motions of opposite sense from a single input motion and being self-balancing with respect to reactive torques applied thereto, said transmission comprising a rotary input shaft, first and second rotary output shafts, a first planetary gear train including a sun gear connected to said first output shaft and a ring gear connected to said second output shaft and at least one planet gear having a carrier, a second planetary gear including a sun gear rotatively connected to said input shaft and a ring gear and a planet gear having a carrier, one of said carrier and ring gear of this second train being rotatively connected to the planet carrier of the first train, a third planetary gear train including a stationary sun gear and a planet gear having a carrier and a ring gear, one of said carrier and ring gear of this third train being connected to the other one of said carrier and ring gear of said second train, and an additional gear train including a gear rotatively connected to the planet gear of said first train and an additional gear engaged with said gear and rotatively connected to the other one of said carrier and ring gear of said third train.

8. A gear transmission for providing two output motions of opposite sense from a single input motion and being self-balancing with respect to reactive torques applied thereto, said transmission comprising a rotary input shaft, first and second rotary output shafts, a first planetary gear train including a sun gear connected to said first output shaft and a ring gear connected to said second output shaft and at least one planet gear having a carrier, a second planetary gear train including a sun gear rotatively connected to said input shaft and a ring gear and a planet gear having a carrier, one of said carrier and ring gear of this second train being rotatively connected to the carrier of the first train, a third planetary gear train including a stationary sun gear and a planet gear having a carrier and a ring gear, one of said carrier and ring gear of this third train being connected to the other one of said carrier and ring gear of said second train, and a fourth planetary gear means including a ring gear and a planet gear connected to the planet gear of said first train, said ring gear of the fourth train being connected to the other of said carrier and ring gear of the third train, said planet gear of the fourth train being connected to the planet gear of the first train.

9. A gear transmission for providing two output motions of opposite sense from a single input motion and being self-balancing with respect to reactive torques applied thereto, said transmission comprising a rotary input member and first and second rotary output members, a first planetary gear train for intergearing said output members for contrarotation, said first gear train including sun, ring and planet gears, one of said gears being rotatively connected to one of said output members and another of said gears being rotatively connected to the other of said output members, a second planetary gear train including sun, ring and planet gears, one of said gears being rotatively connected to said input member and another of said gears being rotatively connected to the remaining one of said gear of said first planetary gear train, and a third planetary gear train including sun, ring and planet gears, one of said gears being stationary and another of said gears being rotatively connected to the remaining gear of said second gear train, and means for rotatively connecting the remaining gear of said third gear train to said remaining gear of said first gear train.

10. A gear transmission for providing two output motions of opposite sense from a single input motion and being self-balancing with respect to reactive torques applied thereto, said transmission comprising a rotary input member and first and second rotary output members, a first planetary gear train for intergearing said output members for contrarotation, said first gear train including sun, ring and planet gears, one of said gears being rotatively connected to one of said output members and another of said gears being rotatively connected to the other of said output members, a second planetary gear train including sun, ring and planet gears, one of said gears of said second gear train being connected to said input member and another of said gears being connected to the remaining gear of said first gear train, and a third planetary gear train including a stationary sun gear and ring and planet gears, one of said ring and planet gears of said third gear train being connected to the planet gear of said second gear train, and the other of said ring and planet gears of said third gear train being rotatively connected to said remaining gear of said first gear train.

11. A gear transmission for providing two output motions of opposite sense from a single input motion and being self-balancing with respect to reactive torques applied thereto, said transmission comprising a rotary input member and first and second output members, a first planetary gear train for intergearing said output members for contrarotation, said first gear train including sun, ring and planet gears, said sun gear being rotatively connected to one of said output members and said ring gear being rotatively connected to the other of said output members, a second planetary gear train including a sun gear, a planet gear, and a ring gear, said sun gear of said second gear train being connected to said input member, said ring gear of said second gear train being rotatively connected to the planet gear of said first gear train, and a third planetary gear train including a stationary sun gear and ring and planet gears, said ring gear of said third gear train being rotatively connected to the planet gear of said first gear train, and said planet gear of said third gear train being rotatively connected to the planet gear of said second gear train.

12. A gear transmission for providing two output motions of opposite sense from a single input motion and being self-balancing with respect to reactive torques applied thereto, said transmission comprising a rotary input member and first and second output members, a first planetary gear train for intergearing said output members for contrarotation, said first gear train including sun, ring and planet gears, said sun gear being rotatively connected to one of said output members and said ring gear being rotatively connected to the other of said output members, a second planetary gear train including a sun gear, a planet gear, and a ring gear, said sun gear of said second gear train being connected to said input member, said planet gear of said second gear train being rotatively connected to the planet gear of said first gear train, and a third planetary gear train including a stationary sun gear and planet and ring gears, said planet gear of said third gear train being rotatively connected to the planet gear of said first gear train, and said ring gear of said third gear train being connected to said ring gear of said second gear train.

13. In a helicopter transmission having a rotary output shaft the combination comprising a control shaft coaxially connected with respect to said output shaft, planetary gear means for driving said control shaft in synchronism with said output shaft, said planetary gear means including sun, planet and ring gears, and means for rotating one of said gears of said planetary gear means to change the relative position of said control shaft with respect to said output shaft.

14. In a helicopter transmission having a rotary output shaft the combination comprising a control shaft coaxially connected with respect to said output shaft, planetary gear means for driving said control shaft in synchronism with said output shaft, said planetary gear means including sun, planet, and ring gears, means for rotating one of said gears of said planetary gear means to change the relative position of said control shaft with respect to said output shaft, and means for moving said control shaft longitudinally with respect to said output shaft.

15. A rotary power transmission for providing two output motions of opposite sense from a single input motion and being self-balancing with respect to reactive torques applied thereto, said transmission comprising a rotary input member and first and second output members, a first planetary gear train for intergearing said output members for contrarotation, said first gear train including sun, ring and planet gears, one of said sun and ring gears being rotatively connected to said first output members, the other of said sun and ring gears being rotatively connected to said second output member, a second planetary gear train including sun, ring and planet gears, said ring gear of said second gear train being connected to said input member, said planet gear of said second gear train being rotatively connected to the planet gear of said first gear train, and a third planetary gear train including sun, ring and planet gears, said sun gear of said third gear train being connected to said sun gear of said second gear train, said planet gear of said third gear train being rotatively connected to said planet gear of said first gear train, and said ring gear of said third gear train being stationary.

16. An automatic rotary power transmission for providing two output motions of opposite sense from a single input motion and being self-balancing with respect to reactive torques applied thereto, said transmission comprising a rotary input member and first and second output members, a first planetary gear train for intergearing said output members for contrarotation, said first gear train including sun, ring and planet gears, and a planet gear carrier, said sun gear being rotatively connected to one of said output members and said ring gear being rotatively connected to the other of said output members, and a second planetary gear train for intergearing said input member to said first planetary gear train, said second planetary gear train being rotatively connected to the planet gear of said first gear train and to the planet gear carrier of said first gear train.

References Cited by the Examiner

UNITED STATES PATENTS

| | | |
|---|---|---|
| 2,285,592 | 6/42 | Ledwinka. |
| 2,401,365 | 6/46 | Mercier _____ 74—801 X |
| 2,480,806 | 8/49 | Desmoulins _____ 74—801 X |
| 2,491,260 | 12/49 | Green _____ 74—801 X |
| 2,538,352 | 1/51 | Chillson. |
| 2,700,311 | 1/55 | Bade _____ 74—674 |
| 2,765,040 | 10/56 | Darrah _____ 74—674 X |
| 2,950,074 | 8/60 | Apostolescu _____ 244—17.23 |
| 3,002,711 | 10/61 | Stefano _____ 244—17.23 |

DON A. WAITE, *Primary Examiner.*

FERGUS S. MIDDLETON, *Examiner.*